(12) United States Patent
Portin et al.

(10) Patent No.: US 7,971,573 B2
(45) Date of Patent: Jul. 5, 2011

(54) SYSTEM FOR REGULATING PILOT FUEL SUPPLY IN A COMBUSTION ENGINE

(75) Inventors: Kaj Portin, Vaasa (FI); Jenny Hellén, Vaasa (FI)

(73) Assignee: Wärtsilä Finland Oy, Vaasa (FI)

( * ) Notice: Subject to any disclaimer, the term of this patent is extended or adjusted under 35 U.S.C. 154(b) by 0 days.

(21) Appl. No.: 12/935,565

(22) PCT Filed: Mar. 25, 2009

(86) PCT No.: PCT/FI2009/050227
§ 371 (c)(1),
(2), (4) Date: Sep. 29, 2010

(87) PCT Pub. No.: WO2009/122011
PCT Pub. Date: Oct. 8, 2009

(65) Prior Publication Data
US 2011/0023826 A1    Feb. 3, 2011

(30) Foreign Application Priority Data

Mar. 31, 2008 (FI) .................................... 20085263

(51) Int. Cl.
*F02D 41/02*    (2006.01)
*F02D 35/02*    (2006.01)
(52) U.S. Cl. ........................ 123/435; 123/299
(58) Field of Classification Search .......... 123/435, 123/299, 300, 304, 478, 480; 701/103–105
See application file for complete search history.

(56) References Cited

U.S. PATENT DOCUMENTS

| | | | |
|---|---|---|---|
| 4,397,285 A | | 8/1983 | O'Neill |
| 4,704,999 A | * | 11/1987 | Hashikawa et al. ........... 123/299 |
| 6,289,871 B1 | | 9/2001 | Brown et al. |
| 6,688,279 B2 | * | 2/2004 | Ishikawa et al. ............... 123/299 |
| 7,360,522 B2 | * | 4/2008 | Tamma et al. ................ 701/104 |
| 2007/0251494 A1 | | 11/2007 | Hashizume |

FOREIGN PATENT DOCUMENTS

| | | |
|---|---|---|
| EP | 1538325 A1 | 9/2003 |
| EP | 1400671 A2 | 3/2004 |
| EP | 1559887 A2 | 8/2005 |
| GB | 2344376 A | 12/1998 |
| JP | 2005-61239 | 3/2005 |
| WO | WO 2007/062341 A2 | 5/2007 |

* cited by examiner

*Primary Examiner* — Hieu T Vo
(74) *Attorney, Agent, or Firm* — Muncy, Geissler, Olds & Lowe, PLLC

(57) ABSTRACT

The invention relates to supplying pilot fuel to the cylinders of a combustion engine. The invention comprises cylinder-specific pressure sensors (1) that are installed in the cylinders of the combustion engine, as well as a control unit (2). The control unit determines each cylinder's crankshaft angle at maximum pressure and the cylinders' average crankshaft angle at maximum pressure, and verifies whether the average crankshaft angle at maximum pressure is within a certain range of crankshaft angle variation. If the average crankshaft angle at maximum pressure is outside the range of variation, the duration of total pilot fuel injection into the engine is controlled. Furthermore, the differences between each cylinder's crankshaft angle at maximum pressure and the average crankshaft angle at maximum pressure are determined. The differences are compared with a certain range of difference variation, and the duration of fuel injection into a cylinder is controlled if the difference in an individual cylinder traverses the minimum or maximum limit of the range of difference variation.

14 Claims, 2 Drawing Sheets

SYSTEM FOR REGULATING PILOT FUEL SUPPLY IN A COMBUSTION ENGINE

FIELD OF TECHNOLOGY

Figure 1:
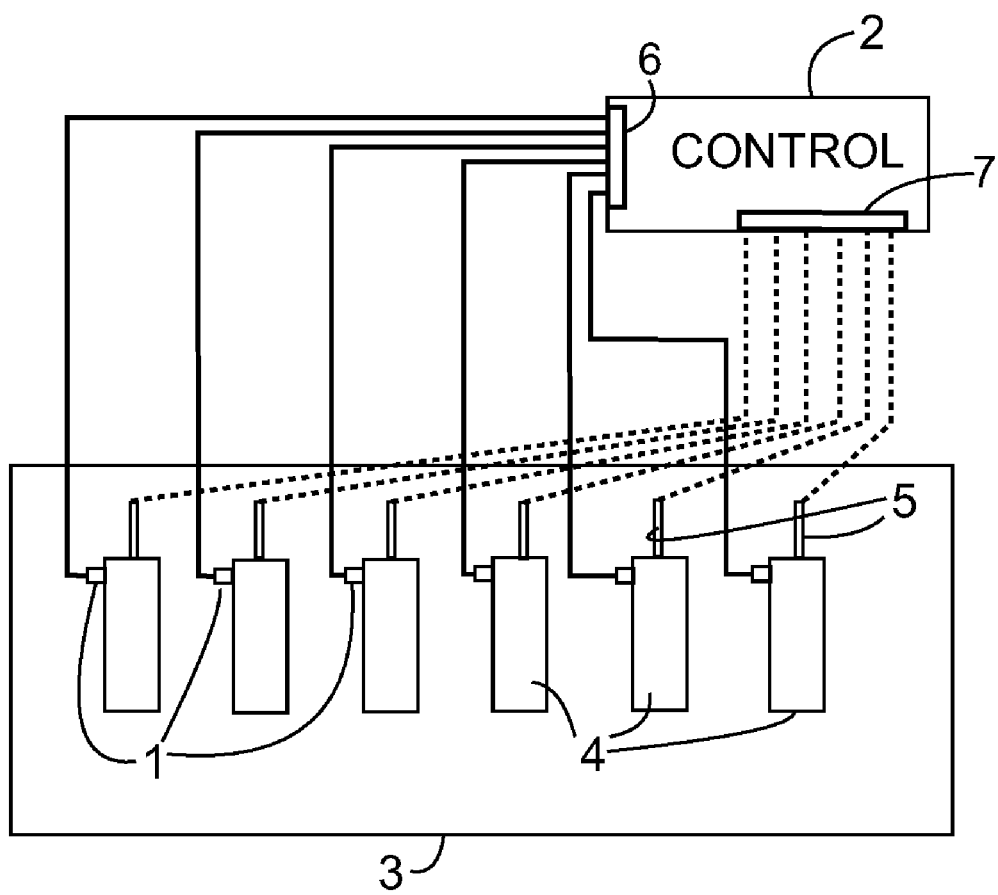

The invention relates to supplying pilot fuel to the cylinders of a combustion engine. The invention particularly relates to gas engines.

PRIOR ART

Fuel is supplied to the cylinders of a combustion engine and burned. The combustion of fuel releases energy, which is converted to mechanical motion using the piston in the cylinder. Cylinder operation is usually divided into four strokes, for example: fuel intake, compression stroke, expansion stroke and exhaust ventilation. The combustion of fuel takes place between the compression and expansion strokes. The strokes combined constitute the cylinder cycle in which the piston in the cylinder has moved in accordance with the strokes and returned to the initial position. The work done during the cycle is transferred to the engine's crankshaft. In combustion engines fueled by gas, also known as gas combustion engines, the fuel is ignited using so-called pilot fuel, for example. The pilot fuel can be diesel, for example. In some solutions the pilot fuel is separately ignited using some kind of ignition means. Other methods include the use of spark plugs, laser or an incandescent element. However, the use of pilot fuel brings benefits such as good engine efficiency and a long maintenance interval.

The time and quantity of supplying pilot fuel into the cylinder are important for efficient engine operation. If the timing or quantity is not correct, the cylinder will produce less power. The cylinder's emissions will also increase. If there is too much pilot fuel, the combustion of fuel in the cylinder generates harmful nitrogen oxides (NOx). On the other hand, if there is too little pilot fuel, the combustion of fuel in the cylinder may generate unburned hydrocarbons (UHC). The quantity and timing of pilot fuel are regulated with the aim of reducing NOx and UHC emissions and maintaining good engine efficiency.

Load on the engine affects combustion conditions in the cylinders. The quantity of pilot fuel required at light load differs from that required at heavy loads. The use of pilot fuel charts that indicate a predetermined quantity of pilot fuel for different engine loads is known from prior art. Thus there are arrangements for the supply of pilot fuel that account for a certain aspect such as emissions or cylinder power. If it is desired that the pilot fuel supply system should account for several aspects, the system requires several different sensors and the processing of data from those sensors. This will easily make the system unreasonably complex and expensive. The construction and operation of parallel systems is also complex and expensive.

SHORT DESCRIPTION OF INVENTION

The objective of the invention is to reduce the problems of prior art. The objective will be achieved as presented in the independent claims. A system according to the invention comprises cylinder-specific pressure sensors 1 that are installed in the cylinders of a combustion engine for measuring cylinder pressures, as well as a control unit 2. The control unit is arranged to determine the crankshaft angle corresponding to maximum pressure in each cylinder of the engine, as well as the cylinders' average crankshaft angle at maximum pressure in response to cylinder pressure measurements and to verify whether the average crankshaft angle at maximum pressure is within a certain range of crankshaft angle variation. If the average crankshaft angle at maximum pressure is outside the range of crankshaft angle variation, the unit is arranged to control the duration of total pilot fuel injection into the engine. If the average crankshaft angle at maximum pressure is within the range of crankshaft angle variation, the control unit is arranged to determine the differences between each cylinder's crankshaft angle at maximum pressure and the average crankshaft angle at maximum pressure. The unit is also arranged to compare the differences with a certain range of difference variation and to control the duration of fuel injection into a cylinder if the difference for an individual cylinder traverses the minimum or maximum limit of the range of difference variation.

LIST OF FIGURES

Figure 2:
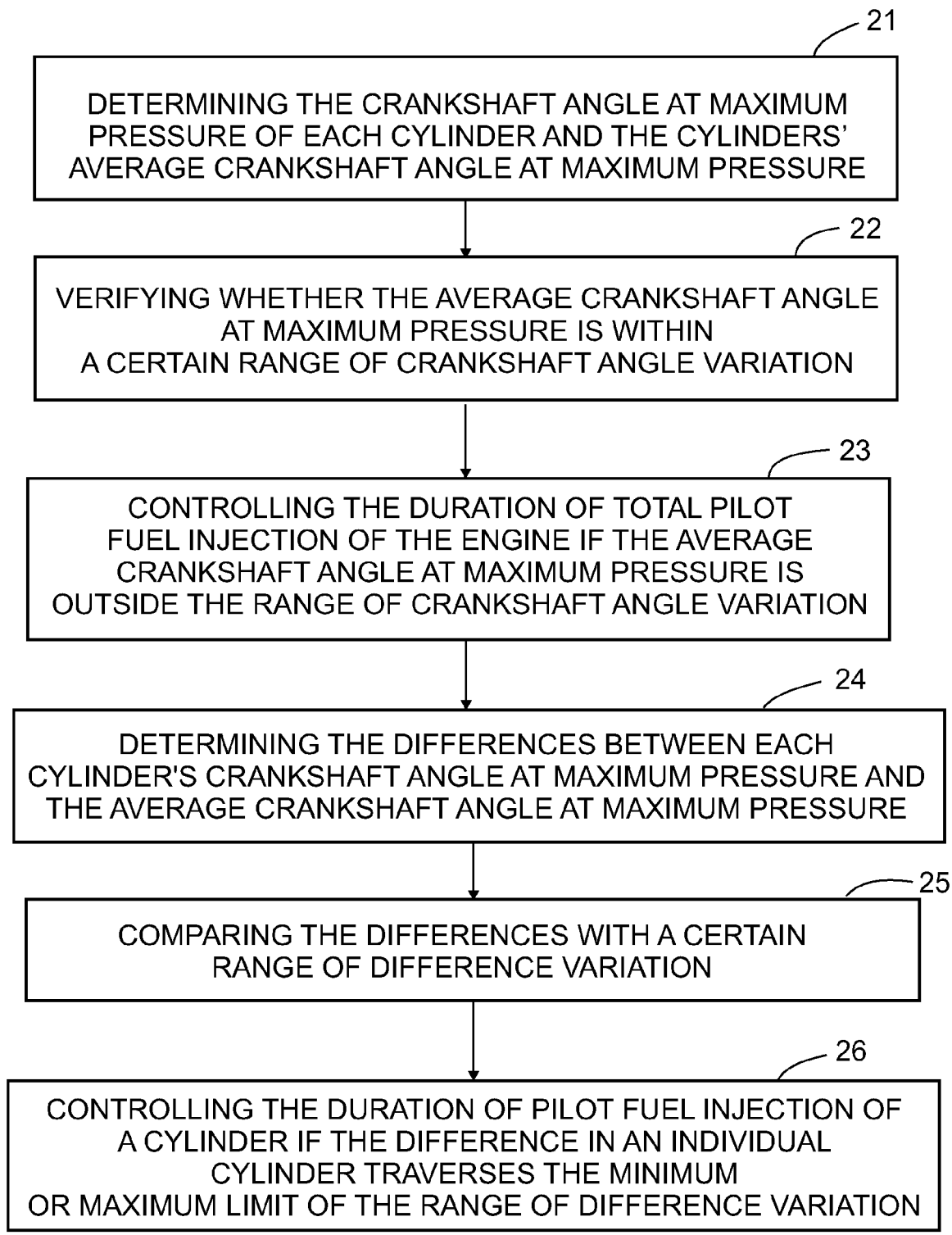

In the following, the invention is described in more detail by reference to the enclosed drawings, where FIG. 1 illustrates an example of an apparatus according to the invention, and FIG. 2 illustrates a flowchart example of the method according to the invention.

DESCRIPTION OF THE INVENTION

FIG. 1 illustrates an example of a system according to the invention installed on a combustion engine 3. The system comprises cylinder-specific pressure sensors 1 that are installed in the cylinders 4 of the combustion engine for measuring cylinder pressures, as well as a control unit 2. The pressure curve for an individual cylinder follows the strokes in the cycle. The pressure is at its lowest during fuel intake and exhaust ventilation. The pressure increases during the compression stroke and reaches its maximum during the expansion stroke. It is preferable that maximum pressure occurs within the crankshaft angle range of −5 to +40 degrees in order to get desired power from the cylinder. The top dead centre (TDC) of the crankshaft is zero degrees. The cylinder pressure measurement data is sent to a control unit 2 that receives measurement data through a reception interface 6.

The control unit is arranged to determine the crankshaft angle at maximum pressure of each cylinder 4 and the cylinders' average crankshaft angle at maximum pressure in response to cylinder pressure measurements. The average crankshaft angle at maximum pressure is arranged to be computed from the cylinders' crankshaft angles at maximum pressure. The control unit is also arranged to verify whether the average crankshaft angle at maximum pressure is within a certain range of crankshaft angle variation, for example −5 to +40 degrees, and to control the duration of total pilot fuel injection into the engine 3 if the average crankshaft angle at maximum pressure is outside the range of crankshaft angle variation. Total pilot fuel refers to pilot fuel supplied to the entire engine—that is, all cylinders of the engine. The duration of total pilot fuel injection affects the quantity of pilot fuel injected into each cylinder, which affects ignition and therefore shifts the point of maximum pressure. If the quantity of total pilot fuel is increased, the pilot fuel and actual fuel will ignite earlier, which means that the point of maximum pressure moves to an earlier point in the cylinder's cycle. If the quantity of total pilot fuel is decreased, the pilot fuel and actual fuel will ignite later, which means that the point of maximum pressure moves to a later point in the cylinder's cycle. Thus the control unit is arranged to decrease the duration of total pilot fuel injection when the minimum limit of the range of variation is traversed, and to increase the duration of total pilot fuel injection when the maximum limit of the range of variation is traversed.

The control unit is also arranged to determine the differences between each cylinder's crankshaft angle at maximum pressure and the average crankshaft angle at maximum pressure as necessary, and to compare the differences with a certain range of difference variation. The range of difference variation is the allowed range for the difference between a cylinder's crankshaft angle at maximum pressure and the average crankshaft angle at maximum pressure. The range of difference variation can be, for example, 5 crankshaft angle degrees to either side of the average crankshaft angle at maximum pressure. Because the point of average maximum pressure depends on engine load, such an arrangement means that the maximum and minimum limits of the range of difference variation are also arranged to depend on engine load. The maximum and minimum limits can of course be made load-dependent also by other means. If the difference in an individual cylinder traverses the minimum or maximum limit of the range of difference variation, the control unit is arranged to control the duration of fuel injection into the cylinder. The duration of pilot fuel injection into the cylinder is reduced if the minimum limit of the range of difference variation is traversed, and the duration of pilot fuel injection into the cylinder is increased if the maximum limit of the range of variation is traversed. If the cylinder's difference remains within the range of difference variation, control is not applied to pilot fuel injection.

The control unit has a control interface 7 through which the pilot fuel injection element 5 for each cylinder is controlled. It must be noted that the interfaces 6, 7 of the control unit can be implemented in different ways, for example as a common bus or as separate cylinder-specific connectors.

FIG. 2 illustrates a flowchart example of the method according to the invention. In response to the engine cylinder pressure measurements, the method comprises a stage for determining each cylinder's crankshaft angle at maximum pressure and the cylinders' average crankshaft angle at maximum pressure 21. The method also comprises stages for verifying whether the average crankshaft angle at maximum pressure is within a certain range of crankshaft angle variation 22, for controlling the duration of total pilot fuel injection into the engine if the average crankshaft angle at maximum pressure is outside the range of crankshaft angle variation 23, for determining the differences between each cylinder's crankshaft angle at maximum pressure and the average crankshaft angle at maximum pressure 24, for comparing the differences with a certain range of difference variation 25, and for controlling the duration of fuel injection into a cylinder if the difference in an individual cylinder traverses the minimum or maximum limit of the range of difference variation 26. If the cylinder's difference remains within the range of difference variation, control is not applied to pilot fuel injection.

In the method according to the invention, the average crankshaft angle at maximum pressure is arranged to be computed from the cylinders' crankshaft angles at maximum pressure, and the maximum and minimum limits of the range of difference variation can be arranged to depend on engine load. The duration of total pilot fuel injection is reduced if the minimum limit of the range of variation is traversed, and the duration of total pilot fuel injection is increased if the minimum limit of the range of variation is traversed. The duration of pilot fuel injection into each cylinder is reduced if the minimum limit of the range of difference variation is traversed, and the duration of pilot fuel injection into the cylinder is increased if the maximum limit of the range of difference variation is traversed.

The arrangement according to the invention only requires sensors of a single type for measuring the pressure in each cylinder. The same measurement data can be used for controlling total pilot fuel as well as cylinder-specific pilot fuel injection. Because both controls affect the duration of fuel injection, the system is simpler and easier to control. No separate sensors and arrangements are required for load-based, efficiency-based and emissions-based control of pilot fuel injection.

It is evident from the description and examples presented above that an embodiment of the invention can be created using a variety of different solutions. It is evident that the invention is not limited to the examples mentioned in this text but can be implemented in many other different embodiments.

Therefore any inventive embodiment can be implemented within the scope of the inventive idea.

The invention claimed is:

1. A system for regulating pilot fuel supply in a combustion engine, which system comprises cylinder-specific pressure sensors for installation in the cylinders of a combustion engine for measuring cylinder pressures, the system comprising a control unit arranged
    to determine the crankshaft angle at maximum pressure of each cylinder and the cylinders' average crankshaft angle at maximum pressure in response to cylinder pressure measurements,
    to verify whether the average crankshaft angle at maximum pressure is within a certain range of crankshaft angle variation,
    to control the duration of total pilot fuel injection into the engine if the average crankshaft angle at maximum pressure is outside the range of crankshaft angle variation,
    to determine the differences between each cylinder's crankshaft angle at maximum pressure and the average crankshaft angle at maximum pressure if the average crankshaft angle at maximum pressure is within the range of crankshaft angle variation,
    to compare the differences with a certain range of difference variation,
    to control the duration of pilot fuel injection into a cylinder if the difference in an individual cylinder traverses the minimum or maximum limit of the range of difference variation.

2. The system according to claim 1, wherein the average crankshaft angle at maximum pressure is arranged to be computed from the cylinders' crankshaft angles at maximum pressure.

3. The system according to claim 2, wherein the maximum and minimum limits of the range of difference variation are arranged to depend on engine load.

4. The system according to claim 3, wherein it is arranged to reduce the duration of total pilot fuel injection when the minimum limit of the range of variation is traversed, and to increase the duration of total pilot fuel injection when the maximum limit of the range of variation is traversed.

5. The system according to claim 4, wherein it is arranged to reduce the duration of pilot fuel injection into a cylinder when the minimum limit of the range of variation is traversed, and to increase the duration of pilot fuel injection into a cylinder when the maximum limit of the range of variation is traversed.

6. The system according to claim 5, wherein the range of crankshaft angle variation is from −5 to +40 crankshaft angle degrees.

7. The system according to claim 6, wherein the range of crankshaft angle variation is 5 crankshaft angle degrees to either side of the average crankshaft angle at maximum pressure.

8. The system according to claim 2, wherein the control unit comprises an interface for receiving cylinder-specific pressure data and another interface for controlling the duration of fuel injection specific to each cylinder.

9. The system according to claim 8, wherein it is connected to a combustion engine.

10. A method for supplying pilot fuel into a combustion engine, wherein, in response to measuring the engine's cylinder pressures, the method comprises stages:
   to determine the crankshaft angle at maximum pressure of each cylinder and the cylinders' average crankshaft angle at maximum pressure,
   to verify whether the average crankshaft angle at maximum pressure is within a certain range of crankshaft angle variation,
   to control the duration of total pilot fuel injection into the engine if the average crankshaft angle at maximum pressure is outside the range of crankshaft angle variation,
   to determine the differences between each cylinder's crankshaft angle at maximum pressure and the average crankshaft angle at maximum pressure,
   to compare the differences with a certain range of difference variation, and
   to control the duration of pilot fuel injection into a cylinder if the difference in an individual cylinder traverses the minimum or maximum limit of the range of difference variation.

11. The method according to claim 10, wherein the average crankshaft angle at maximum pressure is arranged to be computed from the cylinders' crankshaft angles at maximum pressure.

12. The method according to claim 11, wherein the maximum and minimum limits of the range of difference variation are arranged to depend on engine load.

13. The method according to claim 11, wherein it is arranged to reduce the duration of total pilot fuel injection when the minimum limit of the range of variation is traversed, and to increase the duration of total pilot fuel injection when the maximum limit of the range of variation is traversed.

14. The method according to claim 13, wherein it is arranged to reduce the duration of pilot fuel injection into a cylinder when the minimum limit of the range of variation is traversed, and to increase the duration of pilot fuel injection into a cylinder when the maximum limit of the range of variation is traversed.

* * * * *